United States Patent [19]

Cicci et al.

[11] 4,217,746
[45] Aug. 19, 1980

[54] CROP DEFLECTOR

[75] Inventors: George B. Cicci, Burr Ridge; Leo A. Markert, Alsip; George W. Ridge, La Grange; Austin W. Lutz, Jr., Downers Grove, all of Ill.

[73] Assignee: International Harvester Company, Chicago, Ill.

[21] Appl. No.: 37,990

[22] Filed: May 10, 1979

[51] Int. Cl.³ ............................................. A01D 57/26
[52] U.S. Cl. ..................................... 56/14.4; 56/192; 56/DIG. 1
[58] Field of Search ............... 56/1, 14.4, 192, DIG. 1

[56] References Cited

U.S. PATENT DOCUMENTS

| 3,241,300 | 3/1966 | Fell et al. | 56/153 |
| 3,543,491 | 12/1970 | Lausch | 56/192 |
| 3,721,073 | 3/1973 | Scarnago et al. | 56/1 |
| 3,875,729 | 4/1975 | Partsch | 56/192 |
| 3,881,301 | 5/1975 | Sawyer et al. | 56/192 |
| 3,881,303 | 5/1975 | Krafka et al. | 56/1 |
| 4,099,364 | 7/1978 | Kanengieter et al. | 56/1 |
| 4,175,366 | 11/1979 | Cicci | 56/DIG. 1 |

FOREIGN PATENT DOCUMENTS 2007511  9/1971  Fed. Rep. of Germany ............ 56/14.4

Primary Examiner—Paul J. Hirsch
Attorney, Agent, or Firm—Dennis K. Sullivan; Neal C. Johnson; F. David AuBuchon

[57] ABSTRACT

A hay conditioner is provided with a crop deflecting baffle having an operative position for deflecting crops for deposit in a swath. Rearwardly converging deflector vanes are mounted on the baffle, preferably about halfway respectively between the transverse edges of the baffle and the center of the crop stream. Preferably, the angle of convergence of the vanes is less than that of the fixed side deflectors of the preferred windrowing apparatus.

8 Claims, 3 Drawing Figures

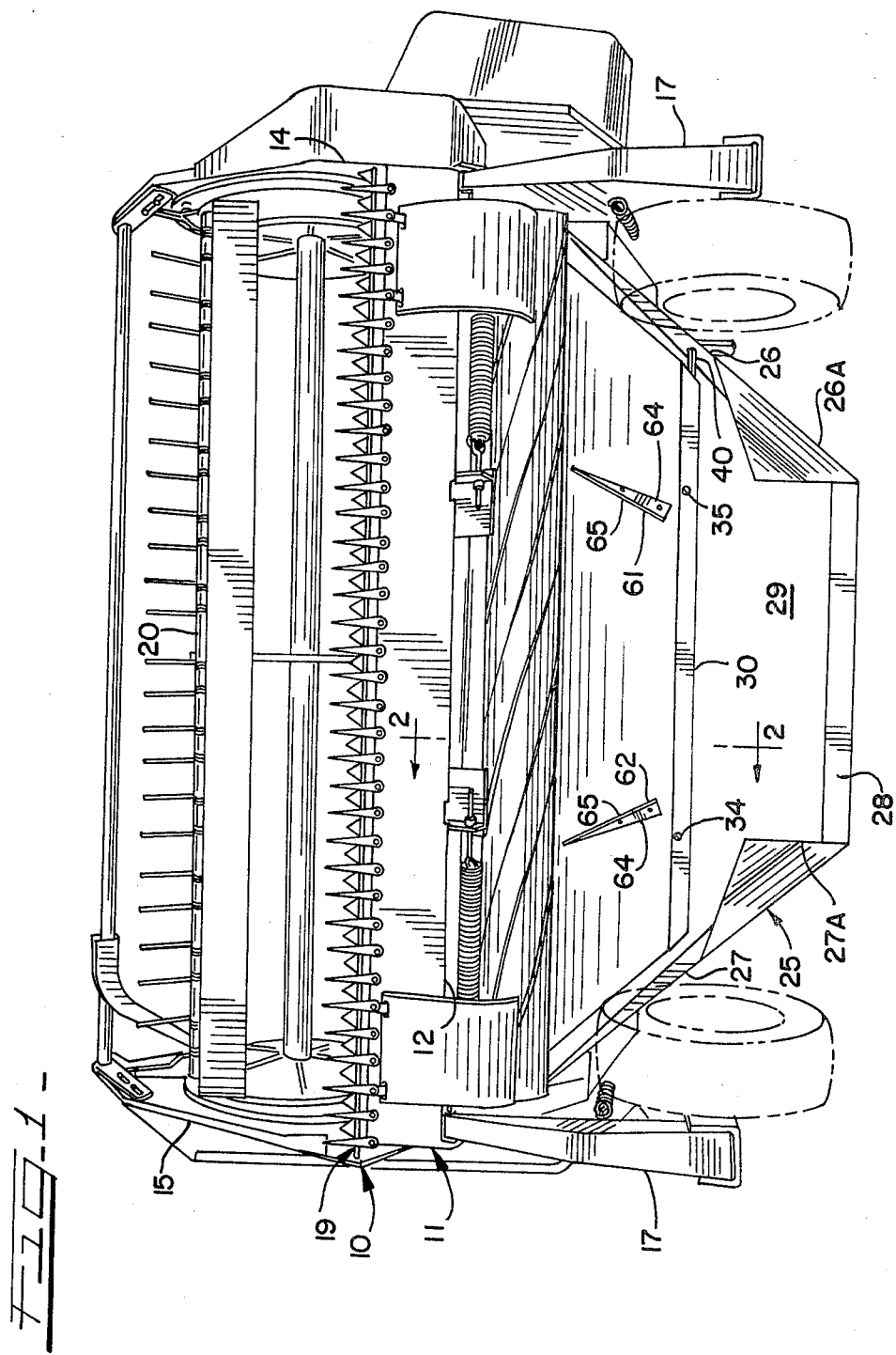

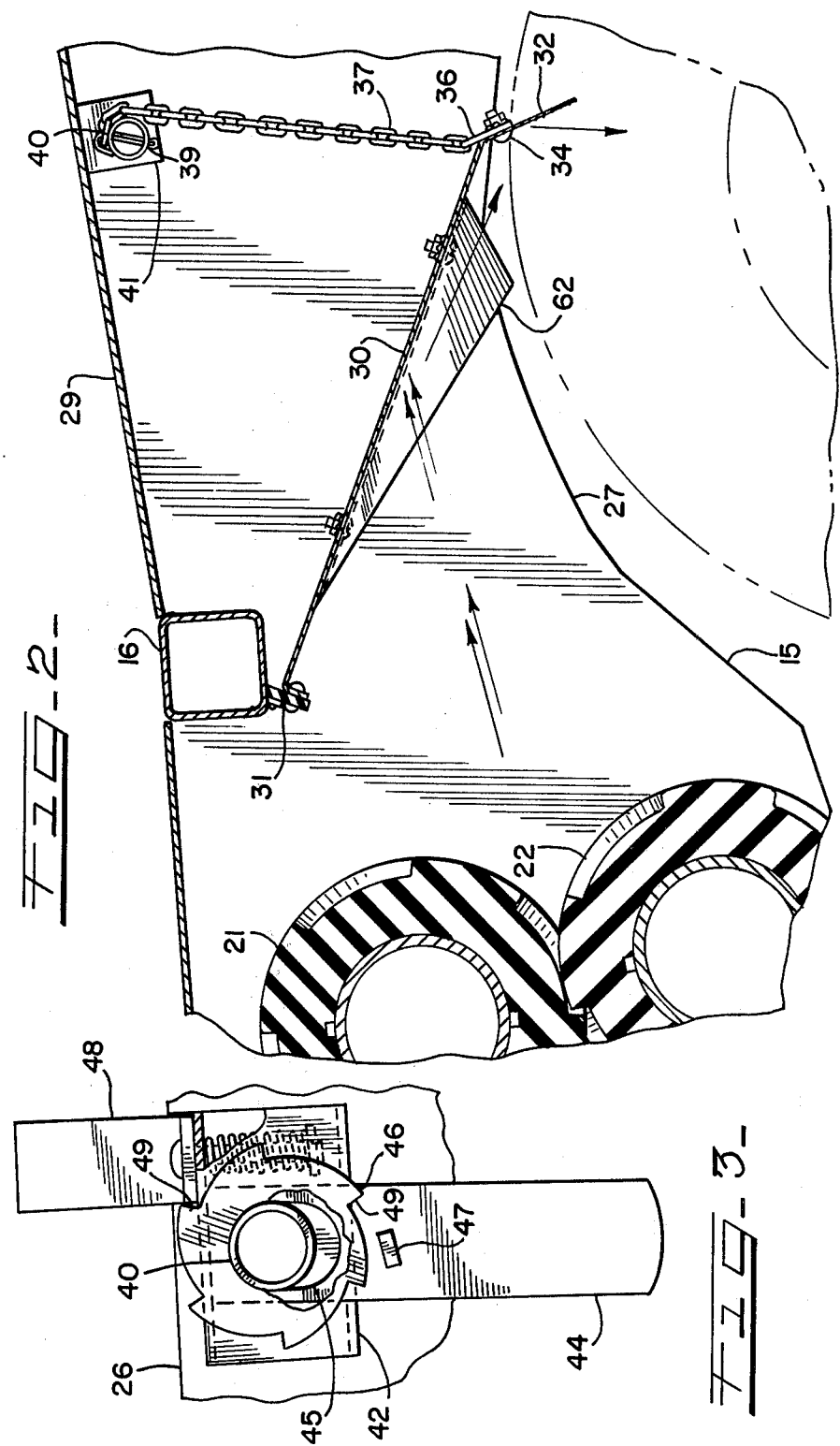

CROP DEFLECTOR

BACKGROUND OF THE INVENTION AND THE PRIOR ART

This invention relates to hay harvesting machines, such as a windrower or mower-conditioner, of the type having a pair of hay conditioning rolls which counterrotate to deliver crops in a rearwardly directed airborne stream for ultimate deposit on the ground in a windrow or in a swath, and, more particularly, to an improved crop deflector or baffle sheet therefor for laying crops in a swath.

It is highly desirable when cutting and conditioning a hay crop to have the option of laying the crop in a swath or consolidatng the crop into a windrow. This has been accomplished in the past by providing a baffle sheet hinged at its leading edge to the machine above the crop flow and adjustably supported at its rear. In its raised position, the baffle sheet is out of the crop flow and the crop is free to pass to the windrowing apparatus for lateral consolidation through a windrow. When the baffle is lowered, the crop stream is intercepted and deflected downward to form a swath. Various baffles or crop deflectors of this type are shown in U.S. Pat. Nos. 3,241,300, 3,543,491, and 3,721,073.

It is further common practice, as shown in some of the above references, to laterally gather the crop slightly, perhaps a foot on each side, as it exits the conditioning rolls but before it contacts the baffle sheet. This is done to produce a swath which will lay within the track of the wheels which are usually within the cutting apparatus width. However, this results in the swath having a greater density near the gathered edges than at the center and leads to a non-uniform drying rate. This, ultimately, results extended drying time in the field or greater spoilage if stored prematurely.

SUMMARY OF THE INVENTION

Accordingly, the primary object of the invention described and claimed herein is to provide a hay harvesting machine of the type described with means for effecting lateral consolidation of the intermediate portions of the crop swath in order to produce a uniform density swath.

This and other objects of the invention are specifically met in a hay harvesting machine having a transversely elongated cutting apparatus, conditioning rolls, and a windrowing means in rearwardly sequential order. A crop deflecting baffle is disposed between the conditioning rolls and the windrowing apparatus, the baffle having an upper inactive position above the crop stream and a lower position intercepting the crop stream and directing it downwardly for deposit on the ground in a swath. The cropward side of the baffle is provided intermediate its ends with deflector vanes which deflect material toward the center of the crop stream, the vanes preferably comprising a rearwardly converging pair disposed about half way between the respective ends of the baffle and the center of the crop stream. Preferably, the angle of convergence of the vanes is slightly less than that of the fixed side deflectors in the preferred windrowing apparatus.

DETAIL DESCRIPTION OF THE DRAWINGS

Other objects and advantages of the invention will become more apparent upon consideration of the following detail description thereof and upon consideration of the drawings in which:

FIG. 1 is a bottom side view of a hay harvesting machine incorporating the claimed invention;

FIG. 2 is a sectional elevation of a portion of the harvesting machine shown in FIG. 1 taken along the line 2—2 thereof; and FIG. 3 is a view of the control mechanism for the crop deflecting baffle illustrated in FIG. 2.

DETAIL DESCRIPTION OF THE PREFERRED EMBODIMENTS

In accordance with the convention of the art, in the following description, the terms left, right, forward, and rearward are to be taken as viewed by one standing at the rear of the machine facing forward.

Turning now to FIG. 1, there is shown a hay harvesting machine 10, such as a mower conditioner of the type illustrated in U.S. patent application Ser. No. 914,320, which patent application is specifically incorporated by reference herein. As viewed from the bottom as shown in FIG. 1, the mower conditioner includes a main frame assembly 11 including a transverse lower beam 12 disposed between left and right vertically extending side sheets 14 and 15. An upper frame member 16 (FIG. 2) is also disposed between the side sheets 14 and 15. The frame is supported by ground wheels (illustrated in phantom) through links 17, as is more fully described in the referenced copending application. Disposed transversely across the forward edge of the lower frame member 12 is a sickle bar cutting apparatus 19. A reel 20 is disposed between the side sheets 14 and 15 for the purpose of conveying crops from the cutting apparatus to a pair of counterrotating hay conditioning rolls 21 and 22, which are journalled on the side sheets and extend transversely therebetween in closely spaced relationship such that crops received therebetween will be propelled rearwardly and slightly upwardly in an airborne stream.

A windrowing apparatus 25 is disposed rearwardly of the crop conditioning rolls for receiving the airborne stream of crops and laterally consolidating the stream a substantial amount for deposit on the ground in a windrow. The windrowing apparatus 25 comprises a fixed hood attached to the frame 11 having rearwardly converging left and right side deflectors 26 and 27 joined by a planar top sheet 29 and a partial rear sheet 28. The lower rearward portions of the side sheets 26 and 27 are folded over somewhat beneath the crop stream as at 26a, 27a to better control the width of the windrow being deposited on the ground.

A transversely planar crop deflecting baffle 30 of generally trapezoidal shape has its forward edge pivotally mounted as by rubber hinge 31 to the lower side of the frame member 16 above and to the rear of the conditioning rolls 21 and 22. The rearmost portion of the baffle terminates in a downturned edge 32 and is provided with bolts 34, 35 which attach shackles 36 to the upper side to which are attached chains 37. The chains 37 extend upwardly whereat they are attached as by cotter pins 39 to a transverse rod 40 made from pipe and journalled to the bottom side of the top sheet 29, as by bracket 41, and extending through the left side deflector 26 as best seen in FIG. 3.

A bracket 42 is mounted on the external portion of the side deflector 26 and rotatably receives the transverse rod 40. A handle 44 having a slotted hole 45 is freely rotatably mounted on the rod 40 outwardly of the bracket 42. External of the handle 44, a star wheel 46 is fixedly mounted on the end of the rod 40 as by welding. The handle 44 is further provided with a dog 47 which, when the slot 45 is taken up in one direction, contacts the radial edges 49 of the star wheel and causes it to rotate and, when the slot is taken up in the other direction, does not contact the star wheel 45. The star wheel 45 is further engaged as at 49 by a spring loaded pawl 48 mounted on the bracket 42. Thus, it will be seen that when the handle 44 is raised so that the dog 47 engages the edge 49 of the star wheel 46, the star wheel and transverse rod 40 will be rotated counterclockwise as viewed in FIGS. 2 and 3 causing the chains 37 to roll up on the rod 40, raising the baffle sheets 30. The pawl 48 prevents the baffle from lowering. When raised to its uppermost position, the deflector baffle 30 is essentially out of the crop stream and crops are free to be trajected in an airborne stream into the windrowing means 25 which consolidates the crop into a windrow for deposit on the ground. By releasing the engagement of the pawl 48 with the star wheel 46, the baffle sheet 30 can be lowered to a position, such as that shown in FIG. 2, whereat the stream of crop will be intercepted at an oblique angle by the baffle 30, and slide along its surface to the rear edge 32 thereof, whereat it is deflected downwardly to the ground before there is substantial consolidation of the swath exiting the conditioning rolls. It will be appreciated, however, that because of the rearward convergence of the fixed side deflectors 26 and 27 that some consolidation of the swath will occur before it is directed to the ground. This is desirable to prevent the wheels of the harvester from running over the swath.

Disposed on the cropward side of the crop deflecting baffle 30, as best seen in FIG. 1, are a pair of rearwardly converging deflector vanes 61 and 62 which have flanges 64 bolted to the deflector sheet on the downstream side of the perpendicular vane portion 65. The portions 65 taper from the forwardmost edge outwardly away from the baffle sheet toward their rear ends (FIG. 2) to prevent hairpinning of crops thereon. It will be seen that the forwardmost portion of the deflector vanes 61 and 62 are disposed respectively about halfway between transverse center of the baffle 30 or of the crop stream and the laterally outer edges of the baffle. The deflectors 65 converge rearwardly but converge at a lesser angle than that of the fixed side wing deflectors 26 and 27.

Viewing FIG. 1, it can be seen that the crop swath exits the conditioning rolls 21, 22 and is laterally consolidated by the fixed wing deflectors 26 and 27 prior to engaging the baffle 30. When the swath hits the baffle 30 and slides along its surface, the intermediate portions of the crop stream will also be consolidated by the deflector vanes 61 and 62. It will also be seen that because of the lesser convergence of deflector vanes 61 and 62 relative to the fixed deflectors 26 and 27 that each of the deflector vanes and its adjacent side deflector also converge slightly which would tend to cause the shadow of the deflector vanes 61 and 62 created by moving the swath portion to the center to be filled in with crops thus promoting a uniform swath density across the entire thickness of the swath.

Thus it can be seen that there has been provided, in accordance with the invention, a crop deflector which fully meets the objects and advantages set forth above. It will be apparent that certain modifications can be made to the above-described embodiment without departing from the true scope of the invention.

What is claimed is:

1. A hay harvesting machine of the type including a frame, a transversely elongated crop cutting apparatus disposed forwardly on said frame, a pair of transverse outer counterrotating hay conditioning rolls disposed on said frame rearwardly of said cutting apparatus, said rolls being closely spaced for receiving cut crop therebetween and propelling it in a rearwardly directed airborne stream, windrowing means disposed rearwardly of said conditioning rolls for receiving said airborne stream and effecting a lateral consolidation thereof for deposit on the ground in a windrow, a transversely extending crop deflecting baffle mounted to said frame rearwardly of said rolls and having a first position located generally above said airborne stream thereby permitting substantial consolidation by said windrowing means and a second position intercepting said stream and deflecting it downwardly for deposit in a swath, and deflector vanes disposed on the laterally intermediate portions of said baffle, said vanes being disposed at an angle to the crop stream to deflect crops toward the center of said stream.

2. The invention in accordance with claim 1 and said second position of said deflector being disposed at an oblique angle to said crop stream.

3. The invention in accordance with claim 1 or claim 2 and said vanes comprising a pair of rearwardly converging vanes disposed respectively on opposite sides of the center of said crop stream.

4. The invention in accordance with claim 3 and the forward end of each of said vanes being disposed approximately half way between the lateral end of the baffle and the center of the crop stream.

5. The invention in accordance with claim 1 or claim 2 and said windrowing means comprising a pair of fixed side deflectors disposed at angles which rearwardly converge toward the center of the crop stream, said deflector vanes being disposed at angles having less convergence than said side deflectors.

6. A hay harvesting machine including a transverse frame, a crop cutting apparatus disposed across the front of the frame, a pair of counterrotating hay conditioning rolls disposed rearwardly of said cutting apparatus on said frame for receiving crops therefrom and propelling said crops in a rearwardly directed airborne stream, windrowing apparatus disposed on said frame rearwardly of said conditioning rolls and including a pair of rearwardly converging fixed side deflectors for laterally consolidating said crops for deposit on the ground in a windrow, a trapezoidal crop deflecting baffle having a forward edge hinged to said frame above the crop stream adjacent the forward portion of said side deflectors, means for controlling the position of the rear edge of said baffle between a first position permitting substantial consolidation by said windrowing apparatus and a second position intercepting the crop stream at an oblique angle and deflecting it downwardly for deposit in a swath of substantially greater width than a windrow, and a pair of rearwardly converging deflecting vanes disposed on the cropward side of said baffle respectively on either side of the longitudinal center line of said windrowing apparatus.

7. The invention in accordance with claim 6 and each of said vanes being disposed about medially between the lateral edges of the baffle and the longitudinal center line of the windrowing apparatus.

8. The invention in accordance with claim 6 and the angle of convergence of said deflector vanes being less than the angle of convergence of said side deflectors.

* * * * *